BEST AVAILABLE COPY

C. W. DAVIS.

TERMINAL FOR ELECTRIC CABLES.

APPLICATION FILED MAY 19, 1909.

Reissued Aug. 23, 1910.

13,145.

WITNESSES:

J. Herbert Bradley

Theodore Kuffs

Charles W. Davis INVENTOR by Christy and Christy

Attys

BEST AVAILABLE COPY

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURG, PENNSYLVANIA, A CORPORATION OF PENNSYLVANIA.

TERMINAL FOR ELECTRIC CABLES.

13,145. Specification of Reissued Letters Patent. Reissued Aug. 23, 1910.

Original No. 919,830, dated April 27, 1909, Serial No. 377,435. Application for reissue filed May 19, 1909. Serial No. 497,129.

*To all whom it may concern:*

Be it known that I, CHARLES W. DAVIS, residing in Edgeworth, in the county of Allegheny and State of Pennsylvania, a citizen of the United States, have invented or discovered certain new and useful Improvements in Terminals for Electric Cables, of which improvements the following is a specification.

My invention relates to improvements in preventing the ingress of moisture within the cable sheath, and to guard against leakage, where the sheath is interrupted, as at a "terminal," where a lead-sheathed underground cable is joined to an aerial line or lines.

Cables of ordinary construction contain insulating material of hygroscopic character, and in such case any moisture which gets access to the interior tends to destroy the insulation and to permit leakage.

Figure 1:
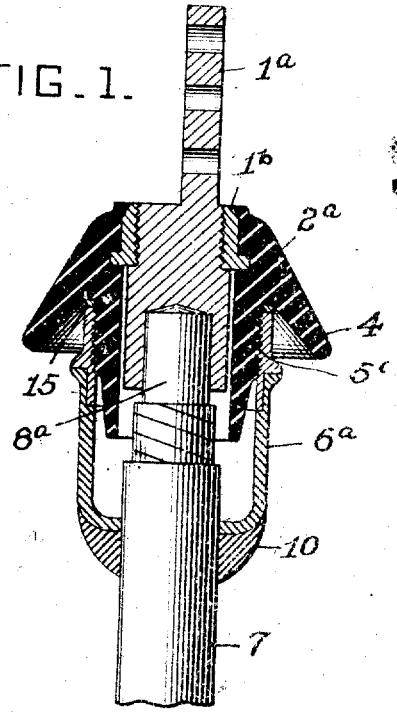
Figure 2:
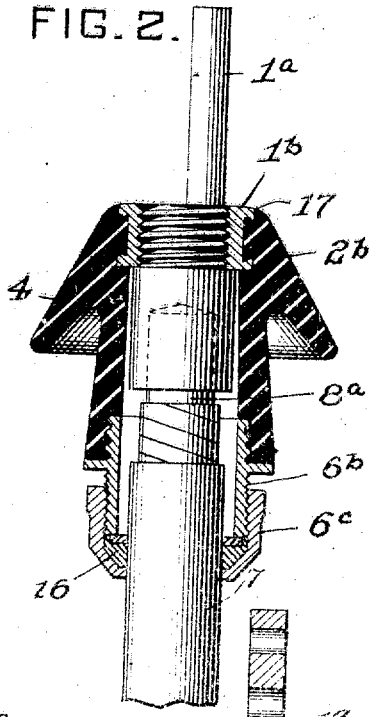
Figure 3:
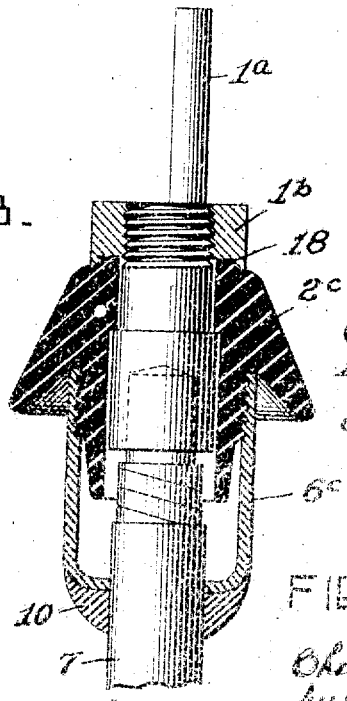
Figure 4:
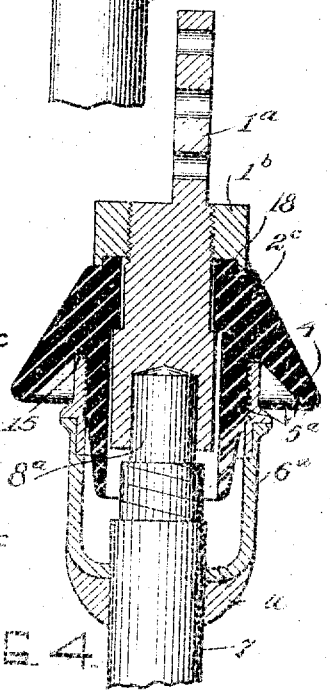

In the accompanying drawings, which form part of this specification, Figure 1 shows in vertical section a terminal for a cable embodying my improvement. Figs. 2, 3, and 4 show structures similar to that of Fig. 1, but with modifications in detail which form parts of my present invention.

In Fig. 1 I have shown my plug construction combined with other parts to form a complete terminal. In this construction, the plug consists essentially of a central core of conducting material, and of a surrounding petticoated insulating body. This central core may be a single integral piece, as shown and described in Letters Patent No. 881,777, dated March 10, 1908, but is preferably formed of two parts $1^a$ and $1^b$, the part $1^b$ being of annular form and having the insulating body $2^a$ formed upon it, and screw-threaded within to receive the part $1^a$, which is correspondingly threaded. Thus the part $1^a$ may be separated from and moved relatively to the part $1^b$ and the insulating body $2^a$, for the purposes presently to be described. The part $2^a$, that is the surrounding body of insulating material formed as described, has a screw thread $5^a$ formed upon its outer surface for the purpose of attachment to the other parts, which together with it form the terminal structure. This screw-threaded surface extends above the plane of the lower edge of the petticoat 4, and thus the joint is effectively protected against the weather. This terminal, illustrated in Fig. 1, is peculiarly applicable to a cable consisting of a single conducting core. I employ as a case or shell the thimble $6^a$, which is substantially cylindrical in form; at one end, the thimble is of suitable size to slip over the lead-sheathed cable 7 and to be attached thereto by the wiped shouldered joint 10; at the other end, this thimble is connected to the plug, preferably in such manner that the point of connection will be protected by the petticoat. These parts, namely the plug with its removable piece $1^a$ and the thimble $6^a$, are constructed in the factory ready for field use. The manner of applying them will be readily understood.

By making the core of the plug in two parts, connection with the cable conductor can be readily made, by what is known as a sweated joint, which in such constructions is ordinarily far preferable. The end of the cable, which in this instance is a cable having a single conductor, is first stripped of its lead sheath and of the layer of insulating material, and the conducting core $8^a$ is itself laid bare. To this bared end of the conductor the central portion $1^a$ of the plug is electrically connected by the familiar sweated joint. When the part $1^a$ is thus connected, the thimble $6^a$ is slipped down over the end of the cable and the part $1^b$ with the petticoat insulating body molded upon it, is then slipped over the part $1^a$ and screwed down to position. The thimble $6^a$ is then attached to the plug and its opposite end secured by suitable means, as a wiped joint, to the sheath of the cable.

In case the material of which the insulating body $2^a$ is formed is of such character that said body would be injuriously affected by heat conveyed to it through the junction box or thimble at the time of forming the wiped solder joint, in consequence of the relatively high conductivity of the material used to form such thimble, I may resort to either of two expedients. I may, in assembling the parts, use a guide provided with screw threads corresponding in size and position with the screw threads of parts $1^b$ and $2^a$, and first apply such guide in place of the insulating body to the core $1^a$, and assemble the thimble and make the wiped joint, and then remove the guide and apply

BEST AVAILABLE COPY parts $1^a$ and $2^a$ in place of it. In such case the threads whereby the core is connected to the conductor and the insulating plug to the thimble should be similar in pitch and direction. This construction is also advantageous, as it permits of the renewal of the insulating plug without detaching the thimble from the sheath, and also the easy filling of the thimble with insulating material. Or, I may form the thimble itself wholly or in part of a material of relatively low heat conductivity. The difficulty in this connection is due to the fact that such metals as are of sufficient hardness to retain a screw thread tapped upon them, are ordinarily of high thermal conductivity; and it will be found best under practical conditions, to form the upper end of the thimble of such a metal as brass, in which the screw thread may be formed, and the lower end of such metal as lead which is of relatively low heat conductivity. This is indicated in Figs. 1 and 4. On the other hand, it may be preferred to form the thimble entirely of lead in the following manner. When the body of insulating material $2^c$ (see Fig. 3) is formed, it may be molded within a lead tube which will afterward be shaped to form the thimble by dressing in the free end of the lead tube to the shape indicated in the drawings. In this case there will be no screwing together of parts $2^c$ and $6^c$; but these parts will be united when applied, and they will be applied as one piece over the part $1^a$ and the cable end after the sweated joint has been formed. When applied and seated the wiped solder joint 10 will be formed. The inner surface of the tube upon which the insulating body is molded will preferably be corrugated, as shown in Fig. 3. In following this alternative last described, the lead of which the tube is formed will preferably be hardened by the addition of a small proportion of tin.

It will be observed that if desired, the interior space within the thimble $6^a$, may be filled with some fluid, or viscid insulating material, and it will be further observed that by suitably constructing and arranging the parts, the upper end of the thimble $6^a$, may be made to abut against the body of insulating material $2^a$ within the protection of the petticoat 4. Here a gasket 15 may be introduced to further secure the joint against ingress of moisture. It will be understood that the aerial line may be connected with the projecting end $1^a$ of the terminal structure in any desired or preferred manner. It will be understood that the position of this terminal when completed should preferably be substantially that shown, with the petticoat 4 of the plug extending downward and protecting, by its encircling downwardly extending surface, the conductor arranged in substantially vertical position, so that the leakage from the aerial to the lead sheath of the cable 7 is interrupted.

As will be readily understood by those skilled in the art, there is a tendency for the lead sheath to slip down when a cable and its terminal are arranged vertically. In the construction shown and described herein the cable conductor and sheath are so secured together, the core being secured to the end of the conductor, the thimble firmly attached to the sheath, and the core and thimble connected together by the insulating plug, that any material relative movements of the sheath and conductor are prevented. It will also be observed that the core or conducting elements which connect the cable conductor to the aerial, is provided with a shoulder which bears against the non-conducting plug when the parts of the terminal are placed in proper position on the cable.

The variation shown in Fig. 2 from the structure shown in Fig. 1 lies primarily in forming a thimble of two pieces $6^b$ and $6^c$, screw threaded so as to be secured together in the manner shown, so that instead of attachment to the cable sheath by the wiped soldered joint 10 of Fig. 1, connection may be made by means of a stuffing gland 16. In this modification also the connection between the insulating body $2^b$ and the thimble $6^b$, instead of being external in respect to the insulation body $2^b$, is internal. In this instance too, is shown means whereby intimate contact may be maintained between the core of the plug and its surrounding body of insulating material, although the material of which the insulating body be formed, is such that as the insulating substance grows cooler it expands relatively to the conducting body. If such were the case in construction illustrated in Fig. 1 for instance—that is, if the substance of which body $2^a$ is formed expanded relatively to the central body $1^b$ as the newly molded body cooled down to normal temperature,—then the contacting surfaces would tend to open, and so far as they might open the structure would be defective. In Fig. 2 I have shown the body $1^b$ provided exteriorly with an inwardly enlarging cavity 17 and the insulating body $2^b$ formed over that surface of the part $1^b$ which is provided with this inwardly enlarging cavity 17, and thus surfaces of contact between the bodies $1^b$ and $2^b$, are provided, over which union will grow more intimate as the cooling body $2^b$ expands relatively to the body $1^b$.

Figs. 3 and 4 illustrate another modification from the form shown in Fig. 1. In this instance the part $1^b$ of the central core is not internal with respect to the body $2^c$, but it is an annulus in shape, and is made to bear upon the body $2^c$. The annulus $1^b$ may

BEST AVAILABLE COPY be grooved along its inner edge 18, and into this grooved inner edge, the body $2^c$ may be fitted. It will be observed that in this instance also, relative expansion of the substance of body $2^c$ compared with body $1^b$ will but serve to increase the closeness of the union of the two bodies. As in the other instance, the body $1^a$ may extend through the body $1^b$ and the parts be secured together by a screw thread if desired.

In forming a connection between the conductor of a cable and an aerial line, the insulation must be removed from the conductor of the cable for a short distance and provision must be made to prevent moisture penetrating the insulation of the cable. These ends are attained in my improved construction, wherein a body of insulating material is applied to the bare conducting surface beyond the insulation of the cable and preferably closely adjacent to the end of such insulation, and a sleeve or thimble extends from the insulating body to the metal sheath, being secured to the latter preferably by a wiped joint. The insulating body is detachably secured to both the conductor and to the thimble as by screw-threads. This construction permits of the thimble and insulating body to be put together, slipped onto the conductor and when the aerial and conductor have been electrically connected, the insulated body secured in position on the conductor, *i. e.*, screwed onto the threaded portion thereof, thereby bringing the thimble into proper position where it is secured to a sheath by a wipe joint. The insulated body can then be unscrewed from the conductor and thimble, the latter filled with insulating material and the insulating material and the insulating body replaced.

I claim herein as my invention:

1. A terminal structure for an electric cable consisting of a plug and a case or thimble, said plug consisting of a centrally arranged and vertically disposed conducting core and a surrounding body of insulating material in moisture tight contact thereon, and formed externally with a surrounding downwardly and outwardly flaring leakage preventing petticoat, said case or thimble being in leakage proof engagement with the cable sheath at one end and with the plug at the other end, the engagement of the case or thimble with the plug being arranged within the protection of the petticoat.

2. A terminal structure for an electric cable consisting of a plug and a metal case or thimble, said plug consisting of a centrally arranged and vertically disposed conducting core and a surrounding body of insulating material in moisture tight contact thereon, and formed externally with a surrounding downwardly and outwardly flaring leakage preventing petticoat, said metal case or thimble being in leakage proof engagement with the cable sheath at one end and with the plug at the other end, the engagement of the case or thimble with the plug being arranged within the protection of the petticoat.

3. A terminal structure for an electric cable consisting of a plug and a case or thimble, said plug consisting of a centrally arranged and vertically disposed conducting core and a surrounding body of insulating material in moisture tight contact thereon, and formed externally with a surrounding downwardly and outwardly flaring leakage preventing petticoat, and said case or thimble having a leakage proof engagement with the cable sheath at one end, and the plug at the other end, the engagement of the case or thimble with the plug being arranged within the protection of the petticoat, and a gasket between the body of the case or thimble and the body of the plug.

4. In a terminal structure and in combination with a case or thimble engaging a sheathed cable, a plug engaging such case or thimble, such plug consisting of a core formed with two separable parts, one of said parts having formed upon it and in moisture proof engagement therewith, a body of insulating material provided externally with a surrounding downwardly extending leakage preventing petticoat and having external of the insulating body means whereby a separable connection may be made with an aerial wire, and the other part of said core adapted to be connected electrically with a cable core, the parts of said plug being arranged and constructed to be brought together and united to the exclusion of moisture from their point of union.

5. A terminal structure for a metal sheathed electric cable consisting of a conducting core adapted to be electrically connected with the conductor of the cable and with an aerial wire, a body of insulating material surrounding and making a moisture-proof engagement with said core and provided externally with a surrounding downwardly extending leakage preventing petticoat, and a thimble having its ends formed respectively of materials of different character, the harder metal engaging the body of insulating material and the metal of the lower conductivity secured by a wiped joint with the cable sheath.

6. A terminal structure for a metal sheathed electric cable consisting of a body of insulating material surrounding and having a moisture proof connection with a conducting core and provided with a surrounding downwardly extending leakage preventing petticoat, a core adapted to be electrically connected at its ends with the conductor of the cable and with an aerial wire, and

BEST AVAILABLE COPY a thimble having one end secured to the metal sheath and the opposite end connected to the insulated body in such manner that such connection will be protected by the petticoat.

7. A terminal structure for a metal sheathed electric cable consisting of a core adapted to be electrically connected with the conductor of the cable and with an aerial wire, a body of insulating material surrounding and having moisture-proof connection therewith and provided with a surrounding downwardly extending leakage preventing petticoat and a metal thimble having one end secured to the metal sheath and the opposite end connected to the insulating body, the point of connection with the insulating body being above a plane coincident with the lower edge of the petticoat and overhung by the latter.

8. A two part terminal structure for a lead sheathed cable, one of said parts being formed of insulating material in moisture proof contact with the conductor and provided with a petticoat, the other of said parts secured by hermetical joint to the cable sheath and connected with said first named part beneath the protection of the petticoat thereof.

9. A two part terminal structure for protecting the connection between a cable core and an aerial line, one of said parts consisting of a conducting element adapted to form the electrical connection between the conductor of the cable and the aerial line, and having insulating material secured in moisture-proof contact thereon and provided with a petticoat, the other of said parts secured by hermetical joint to the cable sheath and connected with said first named part beneath the protection of the petticoat.

10. A two part terminal for a metal sheathed insulated cable, consisting of a metal thimble adapted to be secured at one end to the cable sheath, and a body of insulating material secured to a bare conductor beyond the insulation of the cable and secured to the thimble, the body of insulating material having a sleeve or prolongation adapted when the parts are assembled and applied to form a shield or screen between the bare conductor and the thimble.

11. A two part terminal for a metal sheathed insulated cable having in combination a metallic thimble adapted to be secured at one end to the cable sheath and having its opposite end threaded, a bared conductor having screw threads and an annular body of insulating material provided with screw threads to engage the conductor and the thimble the several threads being of like pitch thereby permitting the insulating body to be simultaneously applied to or detached from the conductor and thimble.

12. A terminal structure for electric cables having in combination a thimble secured to the sheath of the cable, a conducting element for connecting the cable conductor to an aerial, and secured to such conductor an annular non-conducting sleeve connected to the conducting element and the thimble, and a disk carried by the conducting element and adapted to form a tight joint with the end of the sleeve around the conducting element.

13. A terminal structure for an electric cable consisting of a plug and a case or thimble, said plug consisting of a centrally arranged and vertically disposed conducting core provided with a shoulder, a surrounding body of insulating material in moisture-tight contact upon said core and making engagement upon said shoulder against longitudinal displacement, the said case or thimble engaging the cable sheath at one end and the plug at the other end, substantially as described.

In testimony whereof, I have hereunto set my hand.

CHARLES W. DAVIS.

Witnesses:

ALICE A. TRILL,

J. HERBERT BRADLEY.